Patented Nov. 10, 1942

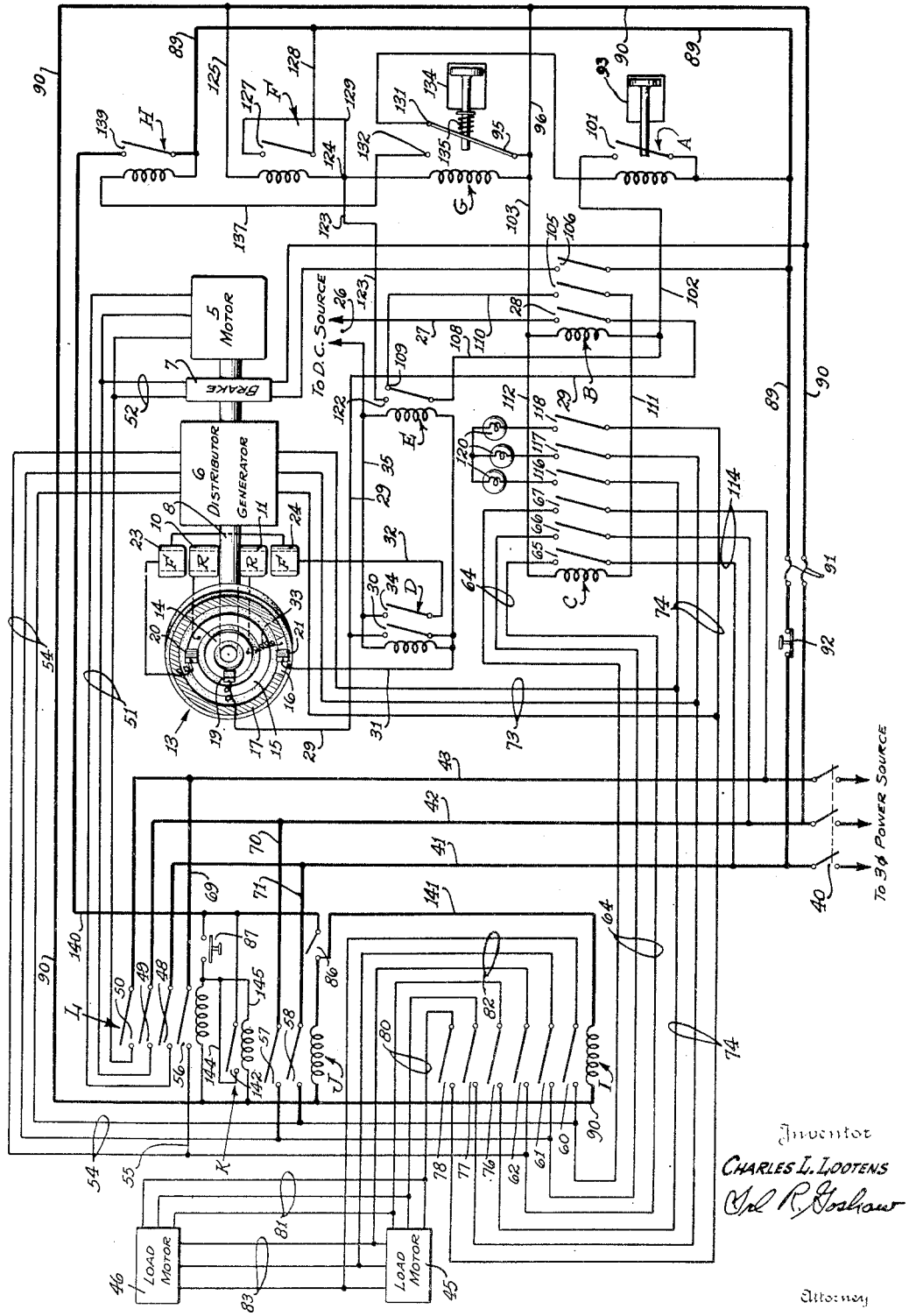

2,301,910

UNITED STATES PATENT OFFICE 2,301,910

ELECTRICAL INTERLOCK CONTROL SYSTEM

Charles L. Lootens, North Hollywood, Calif., assignor to Republic Productions, Inc., a corporation of New York Application December 27, 1940, Serial No. 371,981

13 Claims. (Cl. 172—293)

This invention relates to motor control circuits and particularly to control circuits for motion picture apparatus such as cameras, projectors, and the like.

In the art of motion picture production, many so-called "process" shots are made, these particular shots involving the photographing of a translucent picture screen on the rear side of which there is projected a motion picture. Since both the camera and the projector utilize intermittent pull-down mechanisms and shutters, it is essential that respective elements on both the camera and the projector function synchronously and isochronously. In other words, not only should the films in both the camera and projector be advanced at the same constant speed, but the respective intermittent mechanisms and shutters should have the same constant phase relationship.

In systems of this type the camera and projector motors are started and run in electrical interlock. Such motor drive systems are well known and usually employ a synchronous motor for driving a distributor or alternating current generator which supplies the interlocking power to the rotors of the camera and projector motors. The motors and distributor are first locked in a certain electrical position by energizing one phase of the three-phase circuit to the stators of the distributor and load motors. This connection adjusts the rotors of the load motors to a position depending on that of the rotor of the distributor and in accordance with the number of poles on the distributor and respective motors. The other two phases of the circuit are then energized and the load motors come up to speed in step with the rotation of the rotor of the distributor. In the past, when such systems were used for driving the projector and camera for a process shot, the cameraman and projectionist communicated with one another and adjusted their respective shutters to the same position after the motors had been electrically interlocked. The adjusting mechanism usually included a clutch between the motor shaft and film driving mechanism, one such type of clutch system being disclosed and claimed in U. S. Patents 1,980,-806 of November 13, 1934, and 2,004,992 of June 18, 1935.

In the use of interlock drive systems for motion picture cameras and projectors, the motors thereof generally have a speed different from that of the shutters whose speed is fixed at 1440 R. P. M.. Since these motor speeds are usually 1200 R. P. M., gears are required between the motor and shutter shafts of a ratio such as 6-to-5. However, since the distributor rotor may assume an infinite number of stopping positions, it is obvious that the rotors of the motors may have a similar number of locking positions. It will be appreciated, therefore, that after each interlock, it is necessary that the projectionist and cameraman adjust their shutters with respect to the lock position of the rotors of their respective motors. Now, if the rotor of the distributor always had a predetermined position at interlock, the number of rotor positions for the motors would be materially limited.

The present invention is directed to a system which automatically adjusts the distributor rotor to a predetermined position with respect to its stator immediately subsequent to the disconnection of the distributor, its driving motor and the load motors from the power source. The adjusting mechanism is completely automatic and it is only necessary for the operator to throw the stop switch to immediately set in motion the adjusting mechanism. The adjusting mechanism operates in two steps so that regardless of the stopping position of the distributor rotor, it will be rotated to the predetermined position and then stopped at exactly that point. Should the stopping position be near to the predetermined position, electromagnetic means are energized to slightly rotate the rotor to the exact position desired. Should the stopping position be beyond the limits of control of the electromagnetic means, power is first supplied to the distributor windings to rotate the motor to within these limits, after which power is supplied to the electromagnetic means to accomplish the final positioning.

The principal object of the invention, therefore, is to improve the operation of interlock motor drive systems for motion picture apparatus.

Another object of the invention is to automatically adjust a rotatable element to a predetermined position.

A further object of the invention is to automatically adjust the rotor of an interlock distributing generator to a predetermined setting.

A further object of the invention is to facilitate the adjustment of a generator rotor to a predetermined physical position after the rotor has been stopped.

A further object of the invention is to automatically rotate the rotor of a generator to a predetermined starting position if the rotor does not stop at the predetermined position.

Although the novel features which are believed to be characteristic of this invention will be pointed out with particularity in the appended claims, the manner of its organization and the mode of its operation will be better understood by referring to the following description read in conjunction with the accompanying drawing forming a part thereof, in which the single figure is a diagrammatic-schematic drawing embodying the invention.

Referring to the drawing, a three-phase driving motor 5 of any conventional type is shown mechanically connected to a distributor-generator 6, an electromagnetic brake 7 being positioned on the connecting shaft. The brake 7 is applied when deenergized and is released when energized. Mounted on extension 8 of the distributor shaft are two electromagnetic coils 10 and 11 having iron cores, as shown by the dotted lines. Mounted on the end of the shaft 8 and adapted to rotate therewith is a three-slip-ring disc unit 13 having a copper inner ring 14, an intermediate copper ring 15 and a copper segment 16, all of which are insulated from one another. The rings 14 and 15 are continuous, while only the segment 16, which extends over approximately one-twentieth of the circle, is conducting, the remaining portion 17 of this ring being composed of non-conducting material.

Respective brushes 19, 20 and 21 contact the three rings. The brush 20 is connected to an electromagnetic coil 23 having an iron core, as shown by the dotted lines, and then to a similar coil 24, these coils being stationary except that they may be adjusted to change the stopping position of the shaft 8. It will also be noted that the conducting segment 16 is permanently connected to the inner ring 14 by connection 33, while the inner ring 14 is connected to rotatable coil 11 in series with the rotatable coil 10 and middle ring 15, and that the brush 19 contacts the inner ring 14. Thus, if a source of electrical potential were connected to brush 19 and to coil 24, the four coils would be energized over a circuit from brush 19, inner ring 14, coils 11 and 10, intermediate ring 15, brush 20 and coils 23 and 24.

If we now refer to relays B and D, it will be noted that direct current may be supplied to the coils 10, 11, 23 and 24 from one terminal of a direct current source connected at 26, over conductor 27, contact 28 when closed, conductor 29, through the brush and ring circuit just traced, then over conductor 32, contact 34, when closed, and over conductor 35, to the other terminal of direct current source 26. Thus, with the relays B and D energized, it will be observed that direct current voltage will be impressed upon the coils 10, 11, 23 and 24, energizing these coils and producing an attraction between their respective cores to position and hold the shaft 8 in the position shown in the drawing. To obtain this attraction, the adjacent poles of the cores are given opposite polarities. The energizing circuit is only possible, however, with both of relays B and D energized.

Although the energization of relay B will be explained later, the energization of relay D is under control of brush 21 and segment 16. With the brush 21 on the segment 16 and contact 28 of relay B closed, a circuit is completed from DC source 26, over conductor 27, contact 28, conductor 29, brush 19, ring 14, connection 33, segment 16, brush 21, conductor 31, coil of relay D, and conductor 35 to source 26. This circuit energizes relay D, closing its contacts 30 and 34, the closing of contact 34 energizing the coils 10, 11, 23 and 24, as described above. The closing of contact 30 of relay D will hold this relay energized over a circuit connected between conductors 29 and 35 in case the segment passes beyond the brush 21. It is to be noted that a relay E has its winding connected in parallel with the winding of relay D and is thus simultaneously energized and held energized in the same manner as relay D. The purpose of relay E will be described hereinafter. Thus, with the shaft 8 in such a position that the brush 21 contacts the segment 16, the relay D is energized, in which case the fixed and rotatable coils will be energized and will be so positioned that their energization will permit them to rotate the shaft 8 to a vertical position, as shown, or in any other position in accordance with the adjustment of fixed coils 23 and 24. It will be noted that segment 16 is so located that its center is in line with the axes of coils 10, 11, 23 and 24.

The portion of the circuit above-described is for the purpose of a vernier adjustment of the shaft 8 after the shaft 8 has been rotated to the point where the brush 21 contacts the segment 16. Since this segment is of a length extending over approximately an 18° angle, the rotatable coils will always be close enough to the fixed coils before energization to come within the field of attraction and assure their locking the shaft 8 in a single position. Thus, with the relay B energized and contact 28 closed, energy will be supplied to the relay D, operating this relay, which will close its contacts 30 and 34, one of which holds the relay energized, and the other of which energizes the four positioning coils 10, 11, 23 and 24.

Referring now to the remainder of the circuit, it will be observed that the system is supplied from a three-phase power source over a main switch 40 when closed, this switch connecting the source to three main conductors 41, 42 and 43. The driving motor 5 is connected to the conductors 41, 42 and 43 over contacts 48, 49 and 50 when closed, and conductors 51. Connected across two of the conductors 51 is a pair of conductors 52 for energizing the brake 7, which releases it. Running from the stator of the distributor-generator 6 is a plurality of conductors 54, one of which is connected by a conductor 55 to a contact 56 of a relay L, and the other two of which are connected to contacts 57 and 58 of a relay J. The three conductors 54 are also connected to contacts 60, 61 and 62 of a relay I and also over three conductors 64 to contacts 65, 66 and 67 of a relay C. It will be observed, therefore, that the stator of the distributor-generator 6 will be supplied with power from the main line conductors 41, 42 and 43 over contacts 56, 57 and 58 when relays J and L are energized to close these contacts, conductors 69, 70 and 71 connecting the main conductors to the contacts 56, 57 and 58, respectively.

The rotor of the distributor-generator 6 is connected over three conductors 73 and 74 to contacts 76, 77 and 78 of relay I, these last-mentioned contacts also being connected over conductors 80 to the rotor of the load motor 45 and over conductors 81 to the rotor of load motor 46. Thus, the closing of contacts 76, 77 and 78 will interconnect the rotor of the distributor-generator 6 with the rotors of the load motors 45 and 46. To supply the stators of the load motors 45 and 46 with power, contacts 60, 61 and 62 are closed in addition to contacts 56, 57 and 58, which energizes the load motor stators over conductors 82 to the stator of load motor 45 and conductors 83 to the stator of load motor 46. Thus, to energize the motor 5, the stator of distributor-generator 6 and the stators of load motors 45 and 46, the relays I, J and L must be energized. The motor 5 is then supplied with power over contacts 48, 49 and 50, the stator of the distributor-generator 6 supplied over contacts 56, 57 and 58, and the stators of load motors 45 and 46, over contacts 56, 57 and 58 and contacts 60, 61 and 62. The energization of relay I also connects all the rotors of the distributor-generator and load motors together over contacts 76, 77 and 78.

Thus, with the power switch 40 closed and the relays I, J and L energized, the motor interlock system will be started and run. Since it is well known that in operating such a system, one phase of the stators of the distributor-generator and the motors are first energized, it will be observed that the operation of only relays I and J will accomplish this result, since only contacts 57 and 58 will be closed. The energization of only these relays is accomplished by a lock switch 86, which closes contacts 57, 58, 60, 61, 62, 76, 77 and 78. After the motors and distributor-generator have been locked, a run switch 87 is momentarily closed, energizing relay L, which will close the other two phases of the stators of the distributor-generator and motors over contact 56, and will also close the power circuit to the motor 5 over contacts 48, 49 and 50.

The system so far described includes the direct current portion for obtaining the exact positioning of the shaft 8 and the locking and running circuits for the motors. The automatic control portion of the system for relays I, J and L and the rotation of unit 13 so that segment 16 contacts brush 21 after the motors have been stopped will now be described. Tapped off from main conductors 41 and 42 is a pair of conductors 89 and 90 having a pair of fuses 91 therein and a momentarily-opening stop switch 92. Since switch 92 is normally closed at all times, a circuit may be traced from power conductor 89 through the coil of a relay A, conductor 94, swinger 95 of a relay G, and over conductor 96 to power conductor 90. This circuit will energize the coil of relay A, which closes its contact 101. The relay A is of the slow-to-make type utilizing a dashpot 93 to accomplish the delay action. The purpose of this delayed action will be explained later.

The closing of contact 101 energizes relay B over a circuit extending from power conductor 89, contact 101, conductor 102, the coil of relay B, conductor 103, conductor 96 to power conductor 90. The energization of relay B closes its three contacts 28, 105 and 106, the closing of contact 28 connecting the direct current source at 26 to the coils 10, 11, 23 and 24 if the brush 21 is upon segment 16. If the brush is not on segment 16, the relays D and E remain open, as explained above. However, the energization of relay B, through the closing of contact 106, energizes the brake 7, releasing it.

The closing of the third contact 105 of relay B energizes relay C over an energizing circuit from power conductor 89, contact 101, conductor 102, conductor 108, back contact 109 of relay E, conductor 110, closed contact 105, conductor 111, the coil of relay C, conductor 112, conductor 103, conductor 96 to power conductor 90. The energization of relay C is for the purpose of energizing the distributor-generator 6 and this unit only. It will be noted that the three-phase conductors 41, 42 and 43 are connected to contacts 65, 66 and 67 of relay C, over conductors 114, and with these contacts closed, the stator of the distributor-generator is energized over conductors 114, contacts 65, 66 and 67, conductors 64, and conductors 54. The stators of load motors 45 and 46 will not be energized, however, because contacts 60, 61 and 62 of relay I are not closed. Simultaneously with the closing of contacts 65, 66 and 67, contacts 116, 117 and 118 are closed. The closing of these three contacts short-circuits the rotor windings of the distributor-generator 6 through a plurality of ballast resistance lamps 120 over conductors 73 so that the rotor of the distributor rotates slowly. Thus, the energization of relay C will energize the distributor-generator only and will start the shaft 8 rotating. The shaft 8 will continue to rotate until the brush 21 contacts the segment 16, and when this contact is made, the relays D and E will be energized, as explained above, and direct current energy will be supplied to the coils 10, 11, 23 and 24. The energization of relay E breaks the holding circuit for relay C at contact 109 and power is removed from the distributor 6.

Upon the energization of the relay E, the swinger of the relay moves to its front contact 122, which completes a new circuit as follows: This new circuit is from power conductor 89, over contact 101, conductor 102, conductor 108, contact 122, conductor 123, to a point 124 where the circuit divides, one portion going through the coil of a relay F and over conductor 125 to power conductor 90, and the other over the coil of relay G and conductor 96 to power conductor 90. This circuit immediately energizes relays F and G, and the swinger of relay F immediately closes its contact 127, the closing of which locks the relay F over a circuit from power conductor 89, conductor 128, contact 127, conductor 129, the winding of relay F, conductor 125, to power conductor 90. Although relay G was energized at the same time as relay F, this relay is of the slow-to-break type of relay wherein there is a delay period after energization and before its swinger 95 breaks contact at 131. Although this relay may be of any well known type, it is represented herein as having a dashpot 134 and a spring 135 so that immediately upon energization, the piston starts moving to the left but will not move the swinger 95 until it has taken up the tension in the spring 135. A relay known as the General Electric time-delay relay CR–7504–A1A is satisfactory for obtaining the slow-to-break action. The purpose of this time delay at this point is to permit relay D to remain closed and the coils 10, 11, 23 and 24 to remain energized long enough to accurately position the shaft 8 since there may be a slight hunting action before the shaft 8 becomes stationary.

Upon the breaking of the contact 131, the relay A is deenergized over the circuit first traced, which deenergizes relay B, which, in turn, deenergizes relays D and E. The making of contact 132 of relay G, however, energizes a relay H from power conductor 90, over conductor 96, swinger 95 of relay G, contact 132, conductor 137, the coil of relay H, to the power conductor 89. The energization of relay H will close its contact 139, and this contact will remain closed since relay G is locked up over the locked contact 127 of relay F. The closing of contact 139 will extend power to relays I, J, K and L over conductor 90 and conductor 140.

As mentioned above, relays I, J and L control the locking and starting of the system. Thus, with contact 139 of relay H closed, these relays may now be energized. The closing of lock switch 86 previously described, energizes relays I and J over conductors 90, 140 and 141. Start or run switch 87 is a momentary type of switch, open at all times except when pressed, and the closure thereof energizes both relay L and a relay K, the latter being a holding relay for relay L when the switch 87 is open. Relay K locks itself and relay L over its contact 142 and conductors 144 and 145 connected to conductors 90 and 140. Thus, with lock switch 86 permanently closed and after the momentary closing of switch 87, all the relays I, J, K and L will remain closed as long as there is voltage on conductors 90 and 140. The power may be removed from these conductors, however, by the momentary opening of stop switch 92 which starts the stopping cycle now to be explained.

The momentary opening of stop switch 92 deenergizes a group of relays. First, relays I, J, K and L are deenergized since the power is removed from conductors 90 and 140. Relays G, F and H are likewise deenergized, the swinger 95 of relay G being permitted to make its back contact at 131. The opening of contact 139 of relay H breaks one of the power conductors to relays I, J, K and L so that when the switch 92 is closed, these relays will remain deenergized. Under these conditions the motor 5, distributor-generator 6 and load motors 45 and 46 will come to a stop, brake 7 being applied to the motor 5 and distributor-generator 6, since the power is removed from conductors 52.

Now assuming that the stopping position of the shaft 8 of the distributor-generator 6 is such that the segment 16 is not in contact with brush 21, certain of the relays will be operated as traced above, this cycle, in brief, being as follows: With the swinger 95 of relay G on contact 131, relay A is energized. Relay A is a slow-to-make relay, the purpose of the delay being to permit the rotating rotor of the distributor-generator to come to a complete stop. If relay A closed its contact immediately upon the operation of stop switch 92, the contact 106 of relay B would close, releasing the brake 7. When contact 101 of relay A does close, however, relay B is energized, which, in turn, energizes relay C. The energization of relay C impresses power upon the distributor-generator and starts the shaft 8 rotating until the brush 21 contacts the segment 16. At this point, relays D and E are energized, these relays being locked in position and connecting direct current to the coils 10, 11, 23 and 24 to position the shaft 8 at an exact predetermined point. Energization of relay E deenergizes relay C, disconnecting the power from the distributor-generator 6. The energization of relay E also energizes relays G and F, the energization of relay F locking this relay and relay G.

After a predetermined delay period to permit shaft 8 to become stationary, relay G operates to break its contact at 131 and make contact at 132. The breaking of contact at 131 deenergizes relay A, relay B and relays D and E. The breaking of contact 106 applies the brake 7 to the distributor rotor. The making of contact 132 of relay G energizes relay H, closing contact 139 and providing power to relays I, J, K and L when the locking switches 86 and 87 are closed. The system will remain in this condition until the power switch 40 is opened, when all relays are deenergized. When the power switch 40 is again closed, the system will go through the following cycle and relays G, F and H will lock up. It is desired that this positioning cycle be gone through each time the power switch 40 is closed in case the shaft 8 has been displaced from its predetermined position during disuse of the system. Thus, upon the closing of power switch 40, the shaft 8 is immediately brought to the desired starting position before the system may be started and operated.

Should the system stop so that brush 21 is in contact with segment 16, then the energization of relay B will immediately energize relay E so that relay C will not be energized. Relays G, F and H will lock up, however, readying the system for the interlock and starting operations.

The above system has been used for driving the motors of a process projector and camera and has been found to operate satisfactorily at all times. Its use has avoided substantially all the preliminary adjustments formerly required in making process shots. The invention, of course, eliminates the services of a man to turn the distributor rotor to a predetermined position at the end of each take. Although the invention has been described for driving only two load motors, it is to be understood that more than two motors may be similarly operated with the system.

I claim as my invention:

1. A motor control system comprising a plurality of motors to be started and operated in synchronism, a distributor-generator for controlling the said motors, means adapted to rotate with the rotor of said distributor-generator, said means having attached thereto a plurality of electromagnetic units, a plurality of fixed electromagnetic units adapted to interact with said rotating units for positioning the shaft of said distributor-generator in a predetermined position, and a plurality of relays adapted to energize only said distributor-generator for rotating said distributor-generator to a predetermined point, said relays subsequently disconnecting said distributor-generator and energizing said electromagnetic devices for positioning said distributor-generator shaft.

2. An interlock motor system having a plurality of load motors and a distributor-generator, comprising a source of power, means for normally energizing said distributor-generator and said load motors from said source, means for deenergizing said distributor-generator and said motors, an electromagnetic holding circuit for said distributor-generator, and a plurality of relays operated when said distributor-generator and motors are deenergized for reenergizing said distributor-generator only and for deenergizing said distributor-generator when said electromagnetic holding circuit is energized.

3. An interlock motor system having a plurality of load motors and a distributor-generator, comprising a source of power, means for normally energizing said distributor-generator and said load motors from said source, means for deenergizing said distributor-generator and said motors, and a plurality of relays adapted to be operated when said distributor-generator and motors are deenergized for reenergizing said distributor-generator only, electromagnetic means being provided on said distributor-generator and adapted to be energized when the shaft of said distributor-generator has rotated to a predetermined position and means being provided for deenergizing said distributor-generator when said electromagnetic means are energized.

4. In an electrical interlock motor system, the combination of a plurality of load motors, a distributor-generator, a driving motor for said distributor generator, a source of power, means for normally connecting said distributor-generator and motors to said power source, a plurality of serially operated relays, certain of said relays being energized when said distributor-generator and motors are connected to said power supply, and other of said relays being operated when said distributor-generator and motors are disconnected from said power supply, means operated by said last-mentioned relays for energizing said distributor-generator only, a plurality of electromagnetic means connected to said distributor-generator, and means for energizing said electromagnetic means when the shaft of said distributor-generator is in a predetermined angular position and for deenergizing said distributor-generator.

5. An interlock motor control system comprising a plurality of load motors, a distributor-generator adapted to be connected to said motors, and a driving motor for said distributor-generator, a source of power, an adjusting circuit for said distributor-generator a plurality of relays adapted to connect said source of power to said distributor-generator, said load motors and said distributor-generator driving motor, another plurality of relays adapted to be energized from said power source during the running of said motors, the energization of said last-mentioned relays controlling the operation of said first-mentioned relays, and a third group of relays adapted to energize only said distributor-generator from said power source after said first-mentioned relays have been deenergized to disconnect said distributor-generator, load motors and driving motor from said power source and to deenergize said distributor-generator and energize said adjusting circuit for said distributor-generator.

6. An interlock motor control system comprising a plurality of load motors, a distributor-generator adapted to be connected to said motors, and a driving motor for said distributor-generator, a source of power, a plurality of relays adapted to connect said source of power to said distributor-generator, said load motors and said distributor-generator driving motor, another plurality of relays adapted to be energized from said power source during the running of said motors, the energization of said last-mentioned relays controlling the operation of said first-mentioned relays, and a third group of relays adapted to energize only said distributor-generator from said power source after said first-mentioned relays have been deenergized to disconnect said distributor-generator, load motors and driving motor from said power source, electromagnetic means being provided on the shaft of said distributor-generator, said means being energized after said distributor-generator motor has been rotated to within certain angular limits, and said distributor-generator deenergized.

7. A system for stopping a rotating element at a predetermined position comprising means for rotating said element at a certain speed, means for energizing and de-energizing said rotating means, electromagnetic means for adjusting said element to said predetermined position upon energization of said electromagnetic means, means for energizing said electromagnetic means, and means for disconnecting said energizing means for said rotating means when said electromagnetic adjusting means is energized, said energizing means for said electromagnetic means including a commutator adapted to rotate with said element, and a plurality of relays, one of said relays actuating said disconnecting means, and another of said relays actuating said energizing means for rotating said element, said disconnecting relay controlling the operation of said energizing relay.

8. A system for stopping the shaft of an electromagnetic machine at a predetermined position comprising driving means for said shaft, said shaft also being adapted to be rotated when electrical energy is applied to said machine, means positioned on the shaft of said machine adapted to position said shaft at said predetermined position when said shaft is within certain limits of rotation, means for energizing said machine for rotating said shaft, means for disconnecting said driving means, means for energizing said positioning means, and means for first disconnecting said driving means, then connecting said energizing means for said machine, then disconnecting said energizing means, and then energizing said positioning means.

9. A system in accordance with claim 8 in which means are provided for delaying the energization of said machine a predetermined time after the disconnecting of said driving means.

10. A system for stopping the shaft of an electromagnetic machine at a predetermined position comprising driving means for said shaft, said shaft also being adapted to be rotated when electrical energy is applied to said machine, means positioned on the shaft of said machine adapted to position said shaft at said predetermined position when said shaft is within certain limits of rotation, means for energizing said machine for rotating said shaft, means for disconnecting said driving means, means for energizing said positioning means, and means for first disconnecting said driving means, then actuating said energizing means for said machine, and then energizing said positioning means, said last-mentioned means disconnecting said energization means for said machine simultaneously with the energization of said positioning means.

11. A system for stopping a rotatable element at a predetermined rotational position, a first means for rotating said element at a certain speed, means for energizing and deenergizing said first rotating means, a second rotating means for said element adapted to be energized when said first rotating means is deenergized, means for adjusting and holding said element at said predetermined postion and adapted to be energized when said second rotating means is deenergized, and a plurality of relays for first deenergizing said first rotating means, then energizing said second rotating means and then simultaneously deenergizing said second rotating means and energizing said adjusting means.

12. A system for stopping and locking a rotatable element at a predetermined rotational position, means for rotating said element, means for energizing said rotating means, means for holding said rotatable element in said predetermined position, means for locking said rotatable element in said position, and a plurality of relays for first energizing said rotating means and simultaneously releasing said locking means, then deenergizing said rotating means and energizing said holding means, and then deenergizing said holding means and simultaneously actuating said locking means.

13. A system in accordance with claim 12 in which said holding means includes electromagnets and said locking means includes a brake on said rotatable element adapted to be released when energized and effective when deenergized.

CHARLES L. LOOTENS.